United States Patent [19]

Andrews et al.

[11] Patent Number: 5,508,573
[45] Date of Patent: Apr. 16, 1996

[54] MAGNETIC BEARING WITH PHASE-SHIFTED LOOPS

[76] Inventors: James A. Andrews, 1706 Nickerson St., Austin, Tex. 78704; Joseph F. Pinkerton, 6001 Shepherd Mountain Cove #229, Austin, Tex. 78730

[21] Appl. No.: 237,016

[22] Filed: Apr. 12, 1994

Related U.S. Application Data

[63] Continuation-in-part of Ser. No. 996,192, Dec. 23, 1992, Pat. No. 5,305,874, which is a continuation-in-part of Ser. No. 950,607, Sep. 25, 1992, abandoned.

[51] Int. Cl.$^6$ ..................................... H02K 7/09
[52] U.S. Cl. ........................................ 310/90.5
[58] Field of Search ........................... 310/90.5; 104/282

[56] References Cited

U.S. PATENT DOCUMENTS

| | | | |
|---|---|---|---|
| 4,444,444 | 4/1984 | Benedetti et al. | 310/90.5 |
| 4,779,538 | 10/1988 | Fujiwara et al. | 104/282 |
| 4,785,212 | 11/1988 | Downer et al. | 310/90.5 |
| 4,841,204 | 6/1989 | Studer | 310/90.5 |
| 4,913,059 | 4/1990 | Fujie et al. | 104/282 |
| 5,196,745 | 3/1993 | Trumper | 310/90.5 |
| 5,302,874 | 4/1994 | Pinkerton | 310/90.5 |
| 5,345,128 | 9/1994 | Pinkerton et al. | 310/90.5 |

FOREIGN PATENT DOCUMENTS 5-65919  5/1993  Japan.

*Primary Examiner*—Clayton E. LaBalle
*Attorney, Agent, or Firm*—Beveridge, DeGrandi, Weilacher & Young

[57] ABSTRACT

A magnetic bearing system has magnets for producing magnetic fields, and first and second members which are rotationally fixed together. Each of the members is provided with closed loops of electrically conductive material. The members and magnets are relatively rotatable about an axis of rotation so that the loops travel along a prescribed circular path relative to and through the magnetic fields. The magnetic fields subject the loops to magnetic flux to produce electromotive forces in the loops when the loops deviate from their prescribed circular paths. This induces an electrical current in the loops. The direction of this electrical current is such that, in the presence of the magnetic fields, Lorentz forces are exerted on the loops and the loop-carrying members in directions which are lateral with respect to the circular path. To minimize fluctuations which may cause damaging vibrations, the loops and electromagnets are arranged so that the leading ends of the loops on the first member enter their magnetic fields at times which are different from the times that the leading ends of the loops on the second member enter their magnetic fields.

1 Claim, 1 Drawing Sheet

MAGNETIC BEARING WITH PHASE-SHIFTED LOOPS

REFERENCE TO RELATED APPLICATIONS

This is a continuation-in-part of application Ser. No. 07/996,192 filed Dec. 23, 1992, (now U.S. Pat. No. 5,305,874) which, in turn, was a continuation-in-part of application Ser. No. 07/950,607 filed Sep. 25, 1992, now abandoned.

BACKGROUND OF THE INVENTION

This invention relates to a magnetic bearing system in which there is relative rotation between first and second members, one of which carries a plurality of electrically conductive loops, and the other of which is provided with field magnets which produce magnetic fields to which the loops are subjected. When the relative rotation is such that the loops travel in a prescribed circular path for which they were designed, each loop is subjected to zero net magnetic flux so no electrical current flows through the loops. However, when the path of the loops deviates from the prescribed path, each loop will be subjected to a finite net magnetic flux to produce electromotive forces in the loops. This will induce an electrical current in the loops, the direction of which, in the presence of the magnetic fields, will exert Lorentz forces on the loops and their respective member in a direction which is lateral with respect to the circular path. The lateral direction is radial in a radial bearing, and it is axial in an axial bearing. Such magnetic bearings systems are the subject of U.S. Pat. No. 5,305,874 described above, which is incorporated herein by reference.

It has been discovered that a magnetic bearing of the foregoing type, when subjected to gravitational or other forces, will respond with a force pulses of an alternating nature so that forces are sequentially exerted in opposite directions. If the frequency of these forces is near or equal to a natural frequency of the entire rotor assembly, a mechanical resonance condition may result and the bearing may be damaged or destroyed.

The present invention provides a novel magnetic bearing system which will minimize force fluctuations and provide increased stability over a range of rotational speeds, and it will avoid any risk of vibratory damage brought about by the force pulses as described above.

SUMMARY OF THE INVENTION

This invention relates to the type of magnetic bearing which has a plurality of field magnets which produce magnetic fields, and a member which has a plurality of loops of electrically conductive material fixed thereon. The member and the field magnets are relatively rotatable about an axis of rotation so that the loops on the member travel along a prescribed circular path relative to and through the magnetic fields. The field magnets are located where their fields will subject the loops to magnetic flux. When the loops are traveling in an intended prescribed path, the net flux to which the loops are exposed is zero, but when the path of the loops deviates from the prescribed path, the loops will each be exposed to a finite net magnetic flux which will cause an electrical current to be induced in the loops. The direction of this current, in the presence of the magnetic fields, exerts Lorentz forces on the loops and their respective member in directions which are lateral with respect to the circular path of the loops.

According to the present invention, there are at least two members which each carry a plurality of loops, and the loops and field magnets are arranged so that the leading edges of the loops on the first such member will enter their magnetic fields at times which are different from the times the leading edges of the loops on the second such member enter their magnetic fields.

Although the invention may take many different forms, a preferred embodiment is described below and is shown in the accompanying drawings.

DESCRIPTION OF A PREFERRED EMBODIMENT

Figure 1:
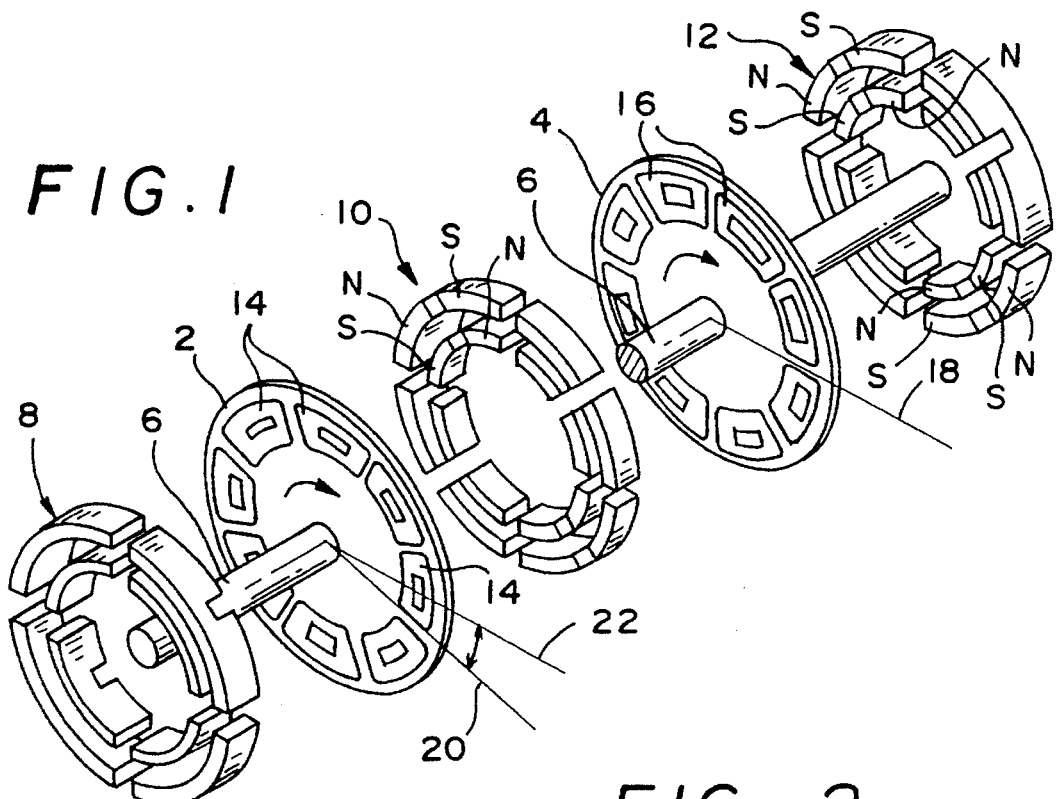
FIG. 1 is a diagrammatic perspective view of a magnetic bearing constructed according to the invention.
Figure 2:
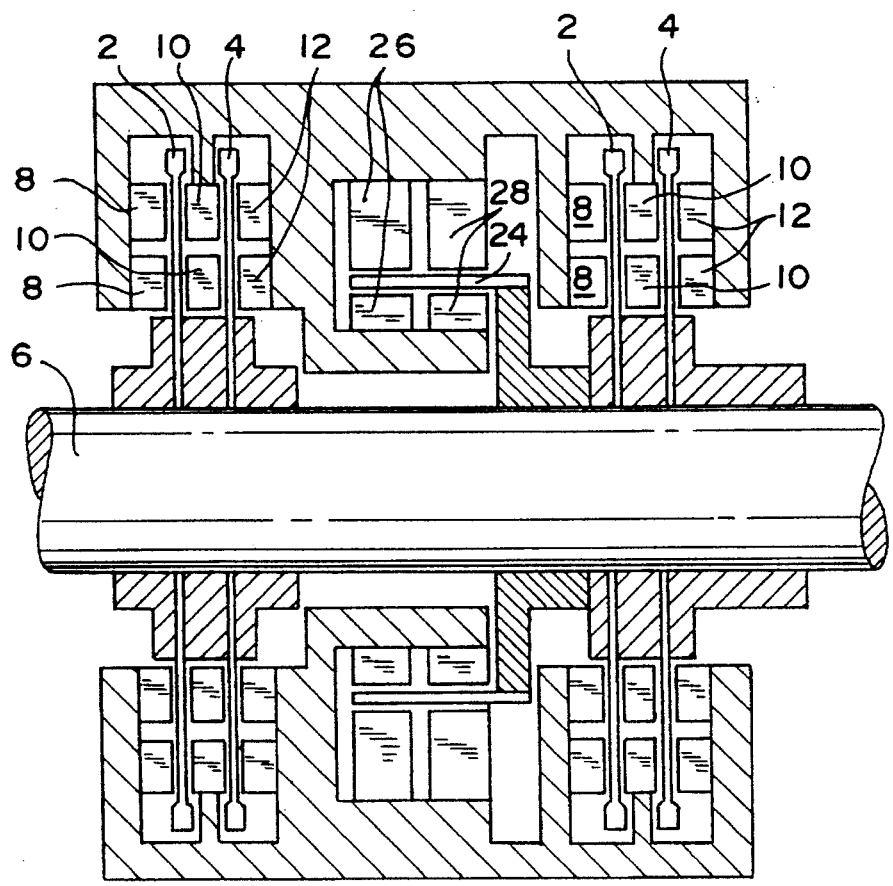
FIG. 2 is a sectional view of a magnetic bearing according to the invention, in which two twin disc radial bearing units according to the invention are located on opposite sides of an axial bearing unit.

Referring to FIGS. 1 and 2, it will be seen that a magnetic bearing according to the invention includes a rotor with two rotating disc members 2 and 4 which are axially and rotationally fixed to a common shaft 6. The forward disc member 2 is positioned between two opposed stationary sets of permanent magnets 8 and 10. In each of these sets, there is an outside ring of four horseshoe magnets and an inside ring of four horseshoe magnets. In each ring of magnets, the poles face axially, and circumferentially adjacent poles have opposite polarities. Radially adjacent poles also have opposite polarities. Furthermore, each pole has a polarity which is opposite to that of the pole which it faces in an axial direction, i.e., the pole on the opposite side of the disc 2. Thus, the magnet sets 8 and 10 produce sixteen distinct fields of axially oriented magnetic flux lines.

The rear disc 4 is identical to disc 2, and it is positioned between the opposed stationary sets of magnets 10 and 12. These magnets create magnetic fields with flux which is directed axially through the disc 4. Each pole has a polarity which is opposite to that of the circumferentially adjacent pole, the radially adjacent pole, and the axially adjacent pole which it faces in the axially adjacent magnet set.

Each disc 2, 4 is made of a nonmagnetic material, preferably fiberglass material, which is not electrically conductive, and it carries eight circumferentially spaced loops 14, 16 formed of electrically conductive material, potted in epoxy and overlaid with a ten mil sheet of fiberglass. Preferably the loops are closed endless loops formed by coiling substantial lengths of conductive wire. As shown in FIG. 2, the discs 2 and 4 may have a thickened perimeter which reduces the deleterious effects of centrifugal force when the disc is rotating at a high angular velocity. The loops on each disc are circumferentially spaced from each other so they will lie in circumferentially spaced magnetic fields. Diametrically opposed loops may be interconnected to form a single closed loop to compensate for dimensional regularities and centrifugal deformation. In discs which have a diameter greater than four inches, a capacitor can be wired in series with each loop.

When the shaft 6 is rotated by a motor, the loops 14 and 16 will travel in circular paths which are concentric with respect to the axis of rotation. When the axis of rotation coincides with the prescribed axis of rotation, the loops will all be travelling in their prescribed circular paths, in a radial sense.

The field magnets in the magnet sets 8, 10, and 12 are located so that their magnetic fields will subject the respective loops to magnetic flux. When the loops are traveling in their prescribed paths, each loop is subjected equally to the flux of outboard and inboard fields. However, when the path of a loop deviates from the prescribed path, the loop will be subjected to unequal amounts of flux from the outboard and inboard magnetic fields. This inequality results in a finite net flux which produces electromotive forces in the loops, thus inducing electrical currents in them. The directions of these electrical currents, in the presence of the fields created by the magnets, is such that Lorentz forces are exerted on each the loop and its respective disc. These Lorentz forces are laterally oriented with respect to the circular path, and they move the loops and their respective member toward the prescribed path. In a radial bearing, this lateral direction is a radial direction and, in an axial bearing, the lateral direction is an axial direction. In each case, the forces tend to move the loops toward their prescribed path and to a position where the loop will be exposed substantially equally to two sets of magnetic fields.

As previously mentioned, it has been discovered that a bearing having a single disc will experience pulsating forces when bearing a load, and that these forces can damage the bearing in some situations. To reduce the risk of such bearing failure, the loops on the two discs are arranged so that their leading edges enter their respective magnetic fields at different points in time. In a two-disc bearing with eight loops per disc, the loops on one disc are shifted 22.5° relative to the loops on the other disc. As shown in FIG. 1, the leading edge of a loop 16 on the rear disc is aligned with a horizontal radial line 18 whereas, on the front disc, the leading edge of a corresponding loop 14 on the front disc 2 is on a radial line 20 which is advanced 22.5° past the horizontal radius 22. The angular displacement, in degrees, of leading edges of loops on one disc relative to leading edges of loops on another disc is preferably (360°)/(nx) where n is the number of loops on each disc, and x is the number of discs. In a three-disc bearing with eight loops per disc, the angular displacement from disc-to-disc is 15°.

With such loop positioning, the leading edges of the loops 14 on the front disc 2 will enter their magnetic fields at times which are different from the times that the leading edges of the loops 16 on the rear disc 4 enter their magnetic fields. The net force of two or more rotors arranged in this fashion will always be positive—towards the prescribed path. As previously explained, this will provide a bearing with increased stability over a range of rotational speeds.

Preferably the discs are located close to each other so that the forces exerted thereon will not result in any significant distortion of the shaft.

In the embodiment shown in FIG. 2, there is an axial bearing with a loop-carrying cylinder 24 which rotates in radially directed magnetic fields emanating from two sets of axially spaced magnets 26 and 28. Details of such a bearing are disclosed in U.S. Pat. No. 5,305,874. On opposite sides of this axial bearing are two twin-disc radial bearings of the type shown in FIG. 1.

If four sets of magnets are used, the loops on two discs can be axially aligned with each other, and the magnets can be angularly offset from each other to provide the benefits of this invention.

Persons familiar with the field of the invention will recognize that it may take many forms other than those shown herein. For example, the discs can be stationary and the magnets can rotate. Electromagnets rather than permanent magnets can be used. The bearing can be an axial bearing with two or more axially spaced sets of loops mounted on one or more cylinders, and two axially spaced sets of magnets which create radially directed, circumferentialy spaced fields of magnetic flux. These sets of loops are angularly offset from each other by (360°)/(nx) in such bearings.

It is emphasized that the invention is not limited only to the disclosed embodiment but is embracing of other rotary magnetic bearings which fall within the spirit of the following claims.

We claim:

1. a magnetic bearing system, comprising, a plurality of members including a first member, and a second member, said members being rotationally fixed with respect to each other, each of said members having a plurality of loops of electrically conductive material fixed thereon, each of said loops having a leading end, a plurality of field magnets for producing a plurality of magnetic fields, said members and said field magnets being relatively rotatable about an axis of rotation so that said loops travel along prescribed circular paths relative to and through said magnetic fields, said field magnets being at locations where their magnetic fields subject said loops to magnetic flux to produce electromotive forces in said loops when said loops deviate from their prescribed path so that an electrical current is induced in said loops, said electrical current having a direction which, in the presence of said magnetic fields, exerts Lorentz forces on said loops and their respective members in directions which are lateral with respect to said circular path, said loops and said electromagnets being arranged so that the leading ends of said loops on the first member enter said magnetic fields at times which are different from the times that the leading ends of said loops on the second member enter said magnetic fields;

the angular displacement of leading edges of loops on one said member relative to leading edges of loops on another said member in degrees being (360°)/(nx) where n is the number of loops on each member and x is the number of members.

\* \* \* \* \*